Dec. 4, 1962 H. HIMMELBERGER 3,066,947
WHEEL STEERING AND SUSPENSION ARRANGEMENT FOR MISSILE DOLLY
Filed Jan. 31, 1961 4 Sheets-Sheet 1

HAROLD HIMMELBERGER
INVENTOR

BY

ATTORNEYS

Dec. 4, 1962 H. HIMMELBERGER 3,066,947
WHEEL STEERING AND SUSPENSION ARRANGEMENT FOR MISSILE DOLLY
Filed Jan. 31, 1961 4 Sheets-Sheet 2

HAROLD HIMMELBERGER
INVENTOR

BY

ATTORNEYS

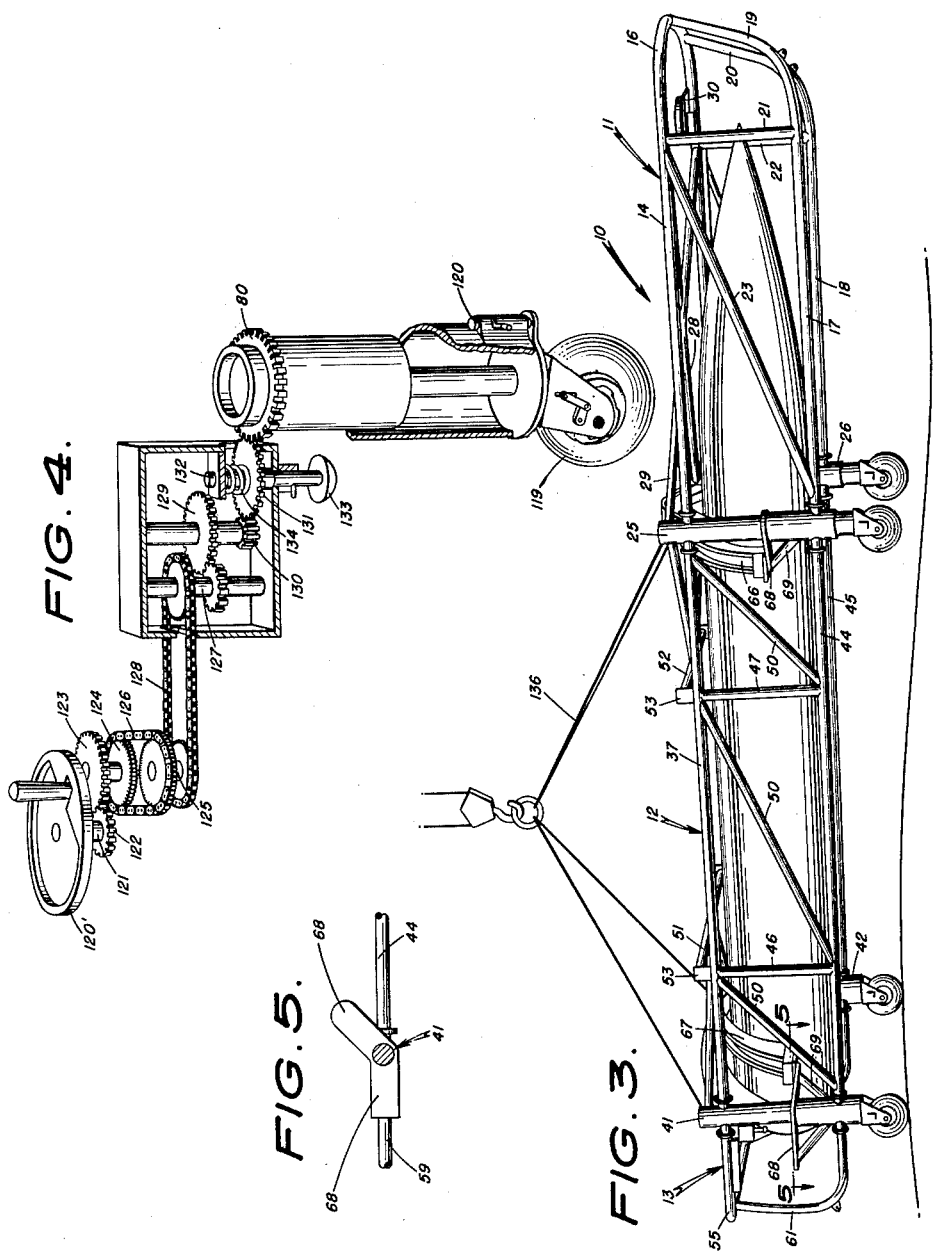

Dec. 4, 1962      H. HIMMELBERGER      3,066,947
WHEEL STEERING AND SUSPENSION ARRANGEMENT FOR MISSILE DOLLY
Filed Jan. 31, 1961      4 Sheets-Sheet 4

HAROLD HIMMELBERGER
INVENTOR

BY

ATTORNEYS 3,066,947
WHEEL STEERING AND SUSPENSION ARRANGEMENT FOR MISSILE DOLLY
Harold Himmelberger, Silver Spring, Md., assignor to the United States of America as represented by the Secretary of the Navy
Filed Jan. 31, 1961, Ser. No. 86,271
9 Claims. (Cl. 280—80)

The present invention relates to an improved transfer dolly, which is designed for moving large missiles or missile boosters from place to place on shipboard, at shore installations, or from shore to ship. The invention is in the same general class as the dollies described in U.S. Patent No. 2,950,123 and in U.S. patent application Serial Number 800,901, filed March 20, 1959 (now Patent No. 2,996,310), Eugene S. Culver, inventor, and assigned to the U.S. Government.

The material handling dollies shown and described in the above referenced patent and patent application are designed for use with relatively light weight missiles and missile components and may be moved about on their casters without the use of special steering apparatus. In certain applications, however, as when transferring very heavy missiles from place to place, it is desirable to provide steering apparatus for the dolly to insure that it will be maintained under control at all times.

An important object of the present invention, therefore, is to provide a heavy duty transfer dolly that is equipped with simple and efficient steering apparatus for maintaining the dolly under control, particularly when used for handling a missile or missile booster.

As another object the invention is to provide a transfer dolly wherein the steering apparatus employed may be disengaged to permit free rolling of the dolly upon a surface when desired.

A further object of the invention resides in the provision of a transfer dolly which is of rugged construction and is thus well suited for use under severe operating conditions.

Still another object of the invention is to provide a transfer dolly that employs simple and effective means for mounting a missile or booster thereon.

And a still further object of the invention is to provide a missile transfer dolly wherein the leg assemblies employed include shock absorber mechanisms and brake mechanisms, and two of said assemblies include additionally portions of the steering apparatus.

Other objects and many of the attendant advantages of the present invention will be readily appreciated as the same becomes better understood by reference to the following detailed description when considered in connection with the accompanying drawings, wherein:

FIG. 3 is a perspective view of the dolly illustrating a missile supported therein;

FIG. 4 is a schematic view of one of the steering mechanisms employed with the dolly;

FIG. 5 is a detail section on the line 5—5 of FIG. 3;

Figure 1:
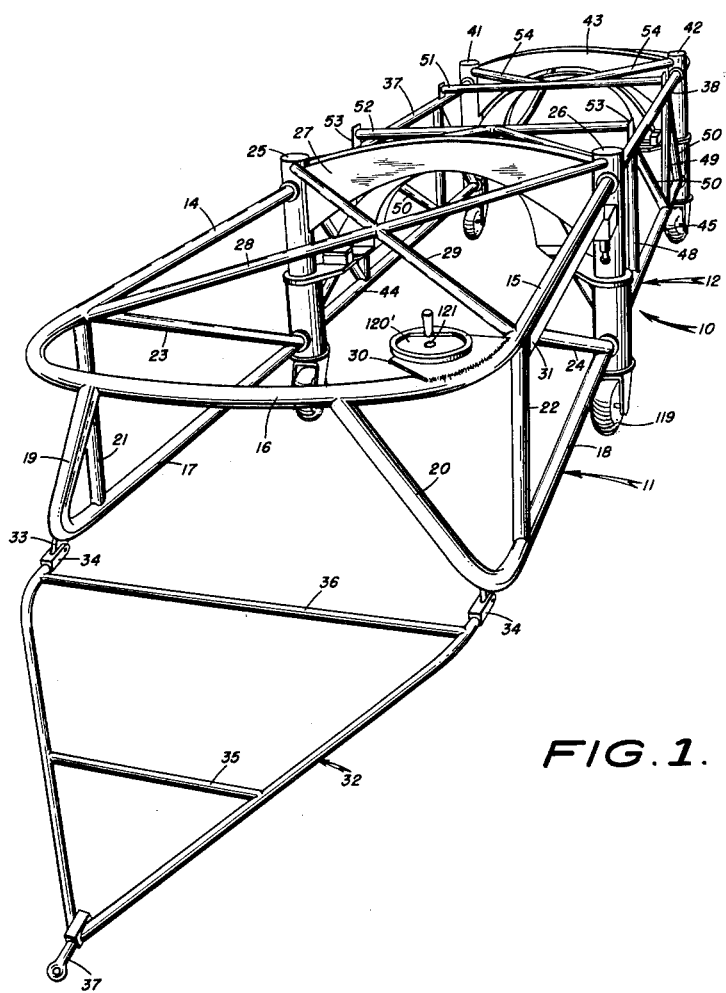
FIG. 1 is a perspective view of the dolly constructed in accordance with the present invention.

Considered briefly, the dolly of the present invention consists of a frame which is formed of heavy guage steel tubing and is supported at four points by leg assemblies. Cross beams extending between opposed leg assemblies, and suitable braces, insure rigidity for the frame. Steering mechanisms are carried by the frame and by two of the leg assemblies, one at each end of the dolly, and a "dead man" brake system is employed for maintaining the dolly under control at all times. Shear mounts, secured to the leg assemblies, provide mountings for the missile supporting yokes by which a missile or booster is positioned in the dolly, for transport thereby. A tow bar assembly is provided and may be attached to either end of the dolly.

Referring now to the drawings in more detail, the frame of the dolly is shown generally at 10, and comprises forward, intermediate and after sections 11, 12 and 13. The forward frame section includes upper rails 14 and 15 which are formed integrally with a substantially semi-circular forward rail 16. Lower rails 17 and 18 have upwardly extending inwardly inclined forward end portions 19 and 20 which are connected to spaced points along the forwardmost portion of the rail 16. Vertical braces 21 and 22 extend between the forward end portions of the upper and lower rails, and additional rigidity is provided by diagonal braces 23 and 24.

The corresponding inner ends of the upper and lower rails 14 and 17 are provided with flanges which are bolted to vertically spaced points on the leg assembly 25. A substantially similar leg assembly 26 has the inner ends of the rails 15 and 18 connected thereto, also by suitable flanges. The leg assemblies 25 and 26 are identical except that the assembly 26 is provided with a part of one of the steering mechanisms contained therein. The leg assembly structure, with its shock absorber, brake and steering mechanism therein, will be described in more detail hereinafter. An upwardly bowed fore cross beam 27, which is of modified I-beam bridge construction, is welded or otherwise suitably secured to the upper end portions of the leg assemblies. Additional diagonally extending braces 28 and 29 extend between the upper ends of the leg assemblies and the forward ends of the upper rails 14 and 15 and, as best shown in FIG. 1, are interconnected at their midportions. The beam 27 cooperates with the leg assemblies 25—26, the braces and the rails for assuring rigidity and ruggedness for the forward section 11 of the dolly. To support one of the steering wheels of the steering apparatus a mounting plate 30 is secured to the forward rail near its junction with the rail 15. The rail 15 also has a guard plate 31, FIG. 1, extending therebeneath to protect the driving chain of the steering apparatus to be more fully described hereinafter.

Figures 2, 7:
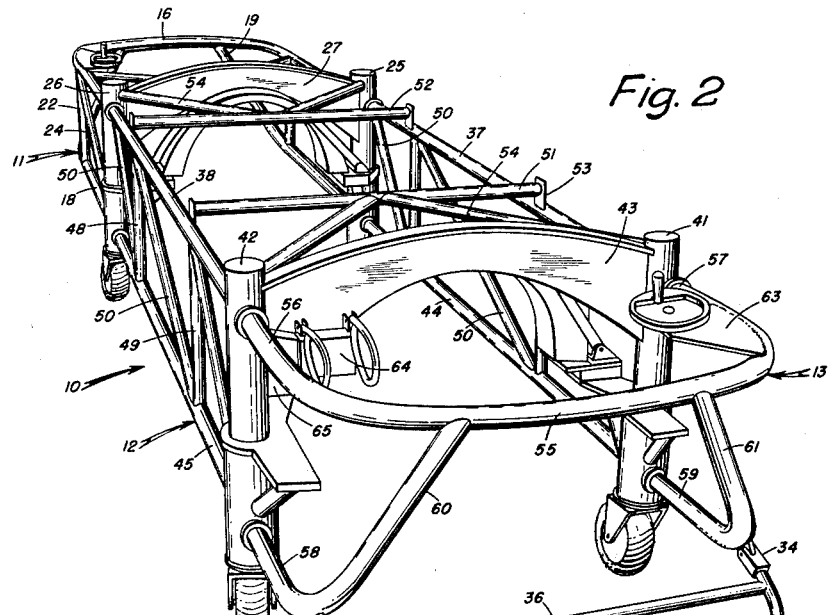
FIG. 2 is a perspective view similar to FIG. 1 but viewed from an after quarter.
FIG. 7 is a detail view of the lock for locking the caster wheels so that they cannot swivel.

To permit attachment of a tow bar 32 apertured lugs 33 are secured to the lower ends of the forward portions 19 and 20, FIG. 1. The tow bar, as best shown in FIGS. 1 and 2, is formed of relatively light-weight steel tubing and is substantially V-shape. The aforesaid tow bar is hingedly connected to the lugs 33 by yokes 34 and suitable pins, the bar being further provided with transverse braces 35 and 36. An eye bolt 37, FIGS. 1 and 2, is mounted at the apex of the tow bar for connection to a conventional fork lift truck or any other suitable vehicle.

The intermediate section 12, as best shown in FIGS. 1 and 3, includes upper rails 37 and 38 and lower rails 44 and 45. Corresponding forward ends of the upper rails 37 and 38 are connected to the leg assemblies 25 and 26 near their upper ends and in alignment with the rails 14 and 15 of the forward section 11. The aft ends of the upper rails 37 and 38 are connected to leg assemblies 41 and 42 near their upper ends. The leg assemblies 41 and 42 are similar to the leg assemblies 25 and 26 and are connected by an aft cross beam 43, similar to the cross beam 27. Lower rails 44 and 45 extend between and are connected to the leg assemblies 25 and 26 and 41 and 42 near their lower ends. It will be noted, FIGS. 1, 2 and 3, that longitudinally spaced vertical braces 46, 47, 48 and 49 are connected between the upper and lower rails at each side of the frame. These braces, together with diagonal braces 50 that also extend between the upper and lower rails, assure rigidity and strength for the sides of the frame. Transverse braces 51 and 52, FIGS. 1 and 2, mounted between lugs 53 located at spaced points along the upper rails 37 and 38, provide bracing for the top of the frame. The braces 51 and 52 have their midpoints connected to the upper ends of the leg assemblies, above the opposite ends of the upper rails 37 and 38, by obliquely extending brace members 54, for effecting still further bracing for the top of the frame.

The aft section 13 of the frame, as more clearly shown in FIG. 2, comprises a generally semi-circular aft rail having straight terminal portions 56 and 57, and lower rails 58 and 59 which have upwardly extending inwardly inclined aft end portions 60 and 61 connected to the rail 55 at spaced points along its aftmost portion. The corresponding free ends of the terminal portions 56 and 57, and those of the lower rails 58 and 59 are connected to vertically spaced points on the leg assemblies 41 and 42, the portions 56 and 57 being in alignment with the upper rails 37 and 38 of the intermediate section 12 and the lower rails 58 and 59 being in alignment with the lower rails 44 and 45 of said section. Apertured lugs 62 are secured to the lower rails 58 and 59 at the junctions thereof with the aft end portions 60 and 61 for permitting attachment of the tow bar 32 when it is desired to move the dolly from its aft end. As best shown in FIG. 2, a mounting plate 63, similar to the mounting plate 30, is welded or otherwise suitably secured to the aft rail 55 on the terminal portion 57 thereof, for mounting the steering mechanism, the construction of which will be more fully described hereinafter. The master cylinder of the brake mechanism, also to be more fully described hereinafter, is shown at 64 and FIG. 2 is mounted on a bracket 65 secured to the leg assembly 42 near its upper end.

From the foregoing description it will be understood that the frame of the dolly is so constructed that it will be open at its bottom throughout its length. This consruction permits lowering of the dolly about a missile or booster to be transported, or the elevation of such missile or booster into the dolly from below, as the case may be. To mount a missile or booster in the dolly for transport yoke assemblies 66 and 67, FIG. 3, are employed. The yoke assemblies are of the same general type shown and described in United States Patent No. 2,925,980, and for this reason further detailed description of the yoke assemblies are deemed unnecessary.

The opposite ends of the yoke assemblies are positioned on shear mount plates 68 which are secured to the leg assemblies near their midpoints. The shear mount plates are braced by brackets 69 which extend between said plates and the lower end portions of the leg assemblies. More specifically, one of the plates 68, with its associated bracket 69, is mounted on each of the leg assemblies 25, 26, 41 and 42. As will be observed, plates and brackets are mounted both fore and aft of the assemblies 41 and 42 in the embodiment of the dolly shown, to permit mounting of the yoke assembly 67 either fore or aft of said leg assemblies, as desired.

Figure 6:
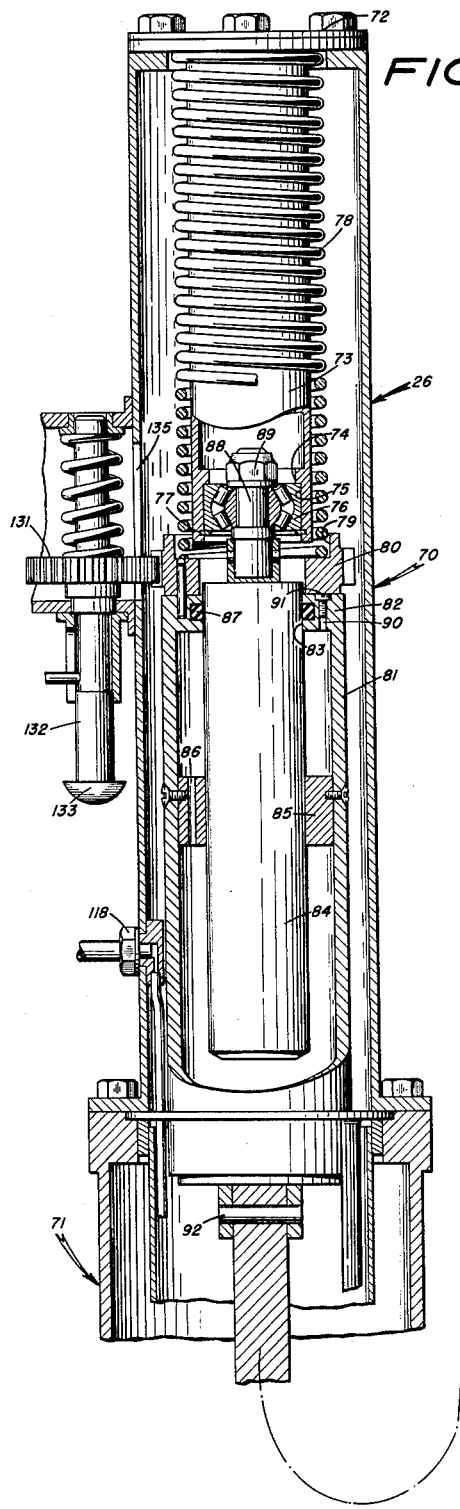
FIG. 6 is an enlarged vertical sectional view illustrating the upper portion of one of the leg assemblies.
Figure 6A:
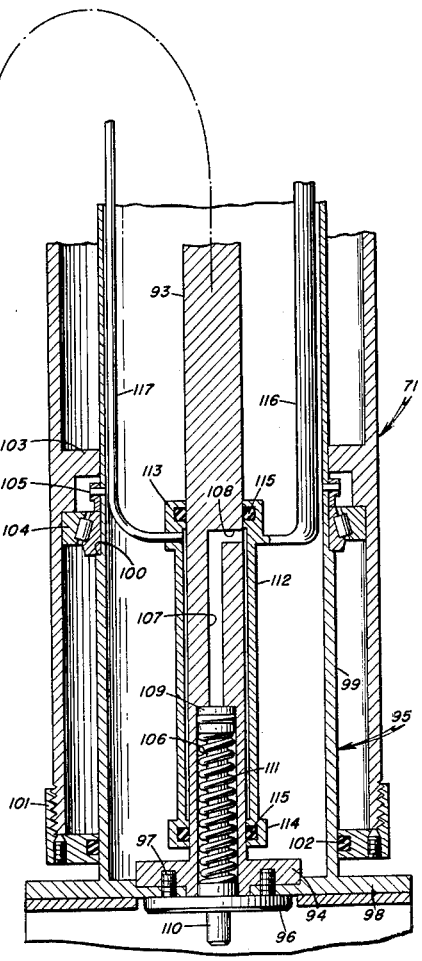
FIG. 6a is an enlarged vertical sectional view illustrating the lower portion of the leg assembly of FIG. 6.

Attention is now directed to FIGS. 6 and 6a of the drawings, wherein the structure of one of the leg assemblies is illustrated. It should be understood that the leg assemblies 25, 26, 41 and 42 are identical except that the assemblies 26 and 41, mounted diagonally opposite each other on the frame 10, carry portions of the steering mechanisms employed.

The leg assembly 26, which will be referred to for purposes of illustration, comprises tubular upper and lower sections 70 and 71, the section 71 being of greater diameter than the section 70. Basically, the upper section 70 contains the shock absorber mechanism and the lower section 71 houses the brake actuating structure. The upper section 70 is closed at its upper end by a cap 72 on which is mounted a guide tube 73, the tube extending downwardly within the section 70 axially thereof. Near its lower end the wall of the tube 73 is thickened and is provided with an inwardly directed shoulder 74 which defines a bearing socket 75, in which is mounted a roller bearing 76. A retaining ring 77 holds the bearing 76 in place in the socket.

The shock absorber mechanism disposed within the tubular section 70 utilizes both coil spring and fluid coupling. The coil spring, shown at 78, surrounds the guide tube 73 and has its upper end seated against the under face of the cap 72. The lower end of the spring is seated in an annular recess 79 formed in the upper face of a ring gear 80 which, in turn, is secured to the upper end of a cylinder 81 that extends downwardly within the tubular section 70. The cylinder 81 has a relatively thick flange 82 at the upper end thereof, the flange being provided with a centrally disposed opening 83 to receive a piston 84. The piston is slidable and disposed in a bushing 85 which divides the cylinder 81 into upper and lower chambers or compartments. A port 86 in the bushing 81 provides communication between the aforesaid compartments, and an O-ring 87 arranged in flange 82 and disposed about the piston 84 seals the upper end of the cylinder 81. The upper end of the piston 84 is provided with a stem 88 which is rotatably mounted in the bearing 76, a nut 89 being threaded on stem 88 in engagement with bearing 76, preventing downward displacement of the piston. To permit the introduction of hydraulic fluid (not shown) to the interior of the cylinder 81 prior to assembly, a filler hole 90 is provided in flange 82, the hold being closed by a cap or plug 91.

By referring to FIG. 6a it will be noted that the cylinder 81 extends downwardly into the lower section 71 of the leg assembly, and that the cylinder has axially mounted thereon as by a pin 92, an actuator shaft 93, the shaft being provided with a flange 94 at the lower end thereof. A guide sleeve or tubular member 95 is secured to the flange 94 by a cap 96 and screws 97, and includes a bottom plate 98 and a side wall 99. The wall 99 is reduced in thickness substantially midway between the upper and lower ends thereof to define a shoulder 100. The guide sleeve extends upwardly within the lower section 71 and is movable vertically therein, as will be more fully described hereinafter. The lower end of the lower section 71 is closed by a cap 101 having an opening thereon for receiving the lower end of guide sleeve 95. It will be noted that an O-ring 102 provides a seal between the cap 101 and the wall 99 of the sleeve 95. An inwardly projecting web 103, located substantially midway between the upper and lower ends of the lower section 71, engages the sleeve 95 and cooperates with the cap 101 for maintaining the sleeve in axially slidable engagement within the section 71. A bearing 104, secured on the sleeve 95 against the shoulder 100 by a ring 105, carried by the sleeve, rotatably connects the sleeve with the section 71.

The lower end portion of the actuator shaft 93 is counterbored to provide a brake cylinder 106, an axial bore 107 having a lateral port 108 communicating between the upper end of said cylinder and the exterior of the shaft. Slidably mounted in the cylinder 106 is a piston 109 which is secured to the upper end of a brake actuator rod 110. A coil spring 111 is disposed about the rod 110 and normally maintains the rod in its uppermost position. FIG. 6a, surrounding the actuator shaft 93 and disposed about the cylinder 106, bore 107, and port 108, and slidably receiving said shaft therethrough, is a jacket 112 having sealing flanges 113 and 114 at its upper and lower ends. O-rings 115 are carried by said flanges in a sealing engagement therewith and with the shaft 93 to prevent escape of fluid from the jacket 112. A bracket 116 rigidly mounts the jacket in the lower section 71, within the sleeve 95 to the cylinder 81 and a tube 117 connected to the jacket as shown in FIG. 6a supplies hydraulic fluid from the master cylinder 64, and appropriate fluid connections to the interior of the jacket and thus to the cylinder 106. One of the connections comprises a fitting 118 mounted in the wall of the upper section 70.

The brake actuator rod 110 is engageable with the caster brake mechanism on a caster wheel 119 mounted on the bottom plate 98 (see FIG. 4). The brake mechanism is of the type shown and described in U.S. patent application Serial No. 32,055, filed May 26, 1960 (now Patent No. 3,002,589), Harry G. Cook, inventor, and assigned to the U.S. Government. A detailed description of the aforesaid brake mechanism in this application is therefore believed to be unnecessary. Briefly, the caster brakes in each of the leg assemblies are normally maintained engaged by virtue of the fact that the rods 110 are held in their uppermost positions in the cylinders 106 by the springs 111. The dolly is thus prevented from moving accidentally. Operation of levers on the master cylinder 64 forces hydraulic fluid into the cylinders 106, through the bores 107 and ports 108, forcing the pistons 109 and rods 110 downwardly for releasing the brakes, whereupon the dolly may be moved over the surface of a deck or the like, as desired. Cessation of operation of the levers of the master cylinder 64 will result in immediate application of the brakes on the caster wheels.

When it is desired to lock the caster wheels 119 so that they cannot swivel, simple pin locks 120, FIG. 4, are employed.

The dolly constituting the present invention is a rugged, heavy duty vehicle. Because this is so it has been found desirable to provide steering means, both fore and aft, to facilitate movement of the dolly on a deck or other surface. As previously stated, steering mechanisms are mounted on diagonally opposite portions of the dolly frame and, since the mechanisms are of identical construction, a description of one will suffice for both. Referring to FIG. 4, the steering mechanism associated with the leg assembly 26, for example, includes a steering wheel 120' which is mounted on a shaft 121 carried by the mounting plate 30. A pinion 122 is mounted on the shaft and meshes with an idler gear 123 which is mounted to rotate with an idler gear 124. The idler gear 124, with the pinion 122 and gear 123, forming a part of a gear and chain arrangement for connecting the steering wheel 120 with the ring gear 80 on the cylinder 81. The remainder of the gear and chain arrangement includes a double idler gear 125, an endless chain 126 connecting the gear 124 with the upper idler 125, a double idler gear 127, a drive chain 128 connecting the lower idler 125 with the upper idler 127, an idler 129 meshing with the lower idler 127, a pinion 130 fixed to rotate with the idler 129, and a clutch gear 131. The clutch gear 131 normally provides a rotatable connection between the pinion 130 and the ring gear 80. The aforesaid clutch gear is rotatably mounted on a plunger 132 which has a knob 133 at its lower end. A spring 134 on the plunger normally retains the clutch gear in mesh with the pinion 130 and ring gear 80. However, when it is desired to permit free rotation of the cylinder 81 and its associated brake and caster mechanism, the plunger 132 is lifted for disengaging the clutch gear from said pinion 130 and ring gear 80. As shown in FIG. 6, a portion of the clutch gear 80 extends into the upper section 70 through a slot 135 in the wall of the aforesaid section.

From the above description it will be understood that the dolly may be steered by rotating the steering wheels and thus moving the casters connected therewith through the aforesaid chain and gear arrangements. The casters which are not provided with steering mechanisms will follow those so equipped. When the dolly is elevated above a deck or other surface, as by cables 136, the cylinder will move downwardly in the lower section 71, whereupon the ring gear 80 will be disengaged from the clutch gear 131. Upon return of the cylinder 81 to rest position, as shown in FIG. 6, after shock absorber action, the ring gear will again mesh with the clutch gear.

The shock absorber structure described hereinabove is necessary to protect the dolly from damage in the event that it should be dropped from a substantial distance above a deck or other surface. More specifically, when the dolly is elevated by the cables 136, the cylinder 81 in each leg assembly will move downwardly in the section 71 and fluid in the lower compartment of the cylinder will be forced through the port 86 in the bushing into the upper compartment. At the same time the spring 78 will be extended. Downward movement of the cylinder 81 will result in similar movement of the actuator shaft, guide sleeve 95 and caster 119. The shock absorber mechanism will then be in its extended position. If the dolly is dropped on the deck, the spring 78 and the movement of the cylinder 81 upwardly along the piston 84, with displacement of the fluid from the upper to the lower compartment thereof, will cushion the dolly and minimize the shock imparted thereto.

The transfer dolly described above and illustrated in the drawings is designed for transporting a missile rather than a booster. A transfer dolly for boosters would be of substantially identical construction but would be of shorter length.

Obviously many modifications and variations of the present invention are possible in the light of the above teachings. It is therefore to be understood that within the scope of the appended claims the invention may be practiced otherwise than as specifically described.

What is claimed is:

1. A missile transfer dolly including a frame comprising forward, intermediate and after sections, a pair of leg assemblies connecting the forward and intermediate frame sections, a pair of leg assemblies connecting the intermediate and after frame sections, each of said leg assemblies having upper and lower cylindrical members, forward cross beams connecting the leg assemblies of the first-mentioned pair, after cross beams connecting the leg assemblies of the second-mentioned pair, brace means for the forward and intermediate frame sections, casters rotatably carried at the lower end of each of the lower cylindrical members, shock absorber means carried by each of said upper cylindrical members, and pressure responsive means carried by said shock absorber means and disposed within said lower cylindrical member and movable from an initial position to a final position thereby to control said casters.

2. A missile transfer dolly as recited in claim 1, including additionally steering means carried by the frame and one of said leg assemblies, said steering means including a shaft and a steering wheel rotatably mounted on the frame, a plurality of gear trains and drive chains operatively connecting the shaft to the steering wheel, and a ring gear on said one assembly and normally in driving connection with the shaft.

3. A missile transfer dolly as recited in claim 1, including additionally steering means carried by the frame and one of said leg assemblies, said steering means being engageable with the shock absorber means of said one leg assembly.

4. In a missile transfer dolly, a frame, a plurality of leg assemblies carried by the frame, each of said leg assemblies having upper and lower cylindrical sections, and shock absorber means carried in the upper section of each of the leg assemblies, each of said shock absorber means including a guide tube rigid with said upper section, a piston connected with the guide tube, a cylinder receiving the piston therein and having an actuator shaft projecting through the lower section, a bushing dividing the cylinder into compartments, a spring about the guide tube and disposed between the upper section and the cylinder, a guide sleeve carried by the actuator shaft and slidable in the lower section, and a rotatable supported caster mounted on said guide sleeve, said cylinder being movable with respect to the piston for moving fluid between the compartments of said cylinder for producing, with said spring, shock absorbing action upon impact of the caster with a surface.

5. A missile transfer dolly as recited in claim 4, including pressure responsive actuating means carried by the actuator shaft and movable from an initial position to a final position thereby to control said caster, and means for moving said pressure responsive actuating means to said positions.

6. A missile transfer dolly as recited in claim 5, wherein said actuating means comprises a cylindrical chamber in the actuator shaft, an axial bore having a lateral port communicating between the cylindrical chamber and the exterior of the shaft, another piston in the cylindrical chamber, an actuator rod connected with said another piston, said rod being movable by said another piston from said initial position to the final position, a jacket surrounding the actuator shaft, means mounting the jacket in the lower section, and means for supplying hydraulic fluid to the cylindrical chamber through the jacket and said bore and port to actuate said another piston and move the actuator rod from said initial position to said final position, said jacket maintaining fluid communication with the cylindrical chamber during movement of the actuator shaft during shock absorber action.

7. In a missile transfer dolly, a frame, a leg assembly carried by the frame, said leg assembly having upper and lower cylindrical sections, shock absorber means carried by the upper section and including a cylinder, an actuator shaft carried by said cylinder and disposed within said lower cylindrical section and having a pressure responsive device mounted therein, a guide sleeve carried by the actuator shaft and slidable in the lower cylindrical section, a caster on said guide sleeve and controlled by said pressure responsive device, means for supplying pressure to said pressure responsive device, and steering means on the frame and connected with the cylinder for rotating the cylinder, actuator shaft, guide sleeve and said caster.

8. A missile transfer dolly as recited in claim 7, wherein said steering means includes a steering wheel on the frame, a ring gear on the cylinder, chain and gear means operatively connecting the steering wheel with the ring gear, and wherein said pressure responsive device includes a rod slidably disposed within said actuator shaft and having a piston at one end thereof and a spring disposed about the rod.

9. A missile transfer dolly as recited in claim 8, wherein said chain and gear means includes a clutch gear normally in engagement with said ring gear and movable for disengaging the ring gear whereby the cylinder, actuator shaft, and caster may freely rotate.

References Cited in the file of this patent

UNITED STATES PATENTS

| | | |
|---|---|---|
| 2,415,928 | Barr | Feb. 18, 1947 |
| 2,455,334 | Hill et al. | Nov. 30, 1948 |
| 2,679,329 | Stout | May 25, 1954 |
| 2,921,784 | Miller | Jan. 19, 1960 |
| 2,950,123 | Nearman | Aug. 23, 1960 |
| 3,002,589 | Cook | Oct. 3, 1961 |

FOREIGN PATENTS

| | | |
|---|---|---|
| 820,228 | Great Britain | Sept. 16, 1959 |